(12) United States Patent
Litteaut et al.

(10) Patent No.: US 6,718,033 B1
(45) Date of Patent: Apr. 6, 2004

(54) PRIVATE NETWORK INTERCHANGE UNIT APPLICATION-ORIENTED HALF-LINK

(75) Inventors: Jacques Litteaut, Marly le Roi (FR); Lahcen Bennai, Argenteuil (FR)

(73) Assignee: Alcatel, Paris (FR)

( * ) Notice: Subject to any disclaimer, the term of this patent is extended or adjusted under 35 U.S.C. 154(b) by 591 days.

(21) Appl. No.: 09/710,886

(22) Filed: Nov. 14, 2000

(30) Foreign Application Priority Data

Dec. 23, 1999 (FR) .............................. 99 16339

(51) Int. Cl.⁷ .......................... H04M 3/00; H04M 5/00
(52) U.S. Cl. .................. 379/269; 379/273; 379/230; 370/395.21; 370/395.43
(58) Field of Search ................ 379/114.01, 114.06, 379/114.28, 114.29, 133, 226.01, 221.01, 221.06, 221.07, 221.14, 229, 230, 242, 243, 258, 268, 269, 271–273; 370/395.21, 395.2, 395.43, 395.1, 385

(56) References Cited

U.S. PATENT DOCUMENTS

| | | | | |
|---|---|---|---|---|
| 4,791,639 A | * | 12/1988 | Afheldt et al. | 370/374 |
| 5,333,183 A | | 7/1994 | Herbert | |
| 5,515,368 A | * | 5/1996 | Saito et al. | 370/428 |
| 6,069,947 A | * | 5/2000 | Evans et al. | 379/229 |
| 6,333,931 B1 | * | 12/2001 | LaPier et al. | 370/385 |
| 6,411,617 B1 | * | 6/2002 | Kilkki et al. | 370/353 |
| 6,487,198 B1 | * | 11/2002 | Pierson, Jr. | 370/356 |
| 6,594,264 B1 | * | 7/2003 | Lin et al. | 370/395.42 |
| 2003/0095542 | * | 5/2003 | Chang et al. | 370/352 |

OTHER PUBLICATIONS

Toit, Du A.: "Private PBX Networks: Cost Effective Communications Solutions" Proceedings of the Africon Conference, US, New York. IEEE, Sep. 22, 1992, pp. 637–640, XP000420285.

* cited by examiner

*Primary Examiner*—Fan Tsang
*Assistant Examiner*—Roland G Foster
(74) *Attorney, Agent, or Firm*—Sughrue Mion, PLLC

(57) ABSTRACT

An interchange unit for a private telecommunications network executing partly in real time and partly in mixed mode, which interchange unit includes a half-link which has an interface using a protocol used by the interchange unit for connecting real time applications to the outside and an application-oriented interface to at least one mixed mode application. The invention enables dialog between a real time application and a mixed mode application without entailing modification of the real time applications.

2 Claims, 1 Drawing Sheet

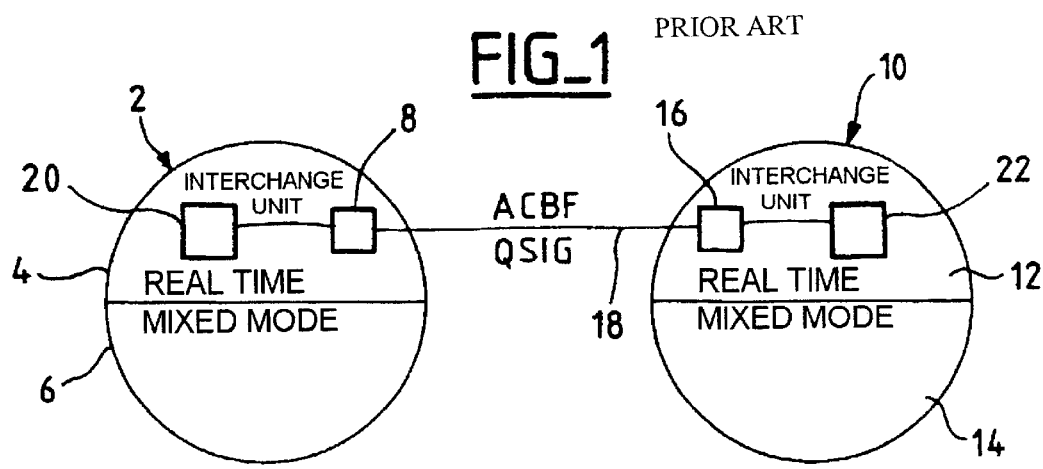
FIG_1 PRIOR ART
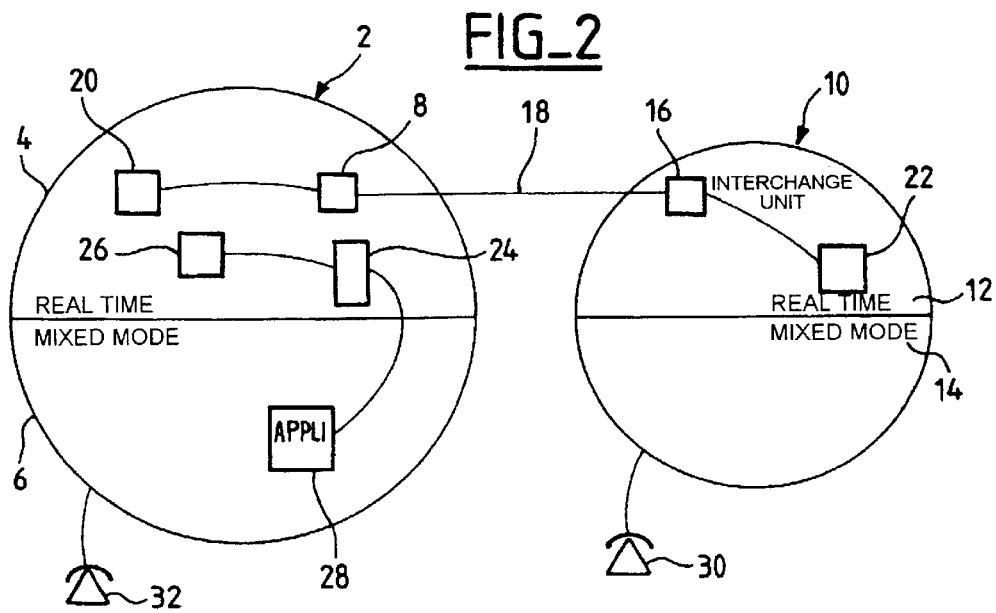
FIG_2
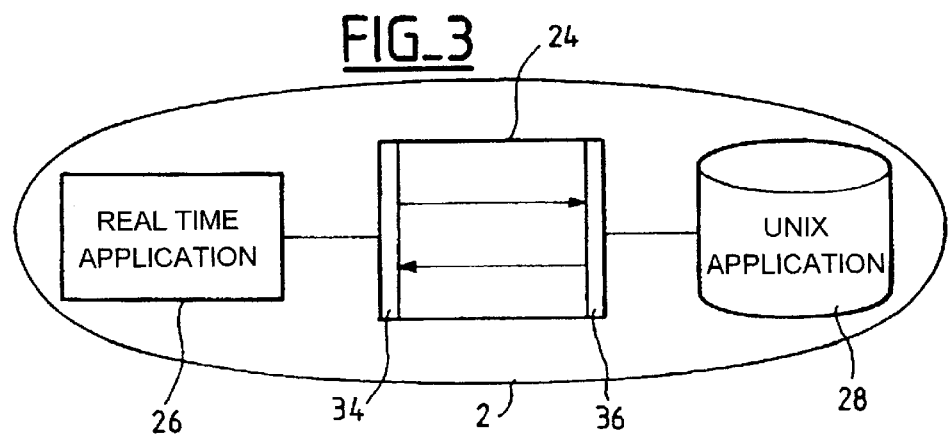
FIG_3

PRIVATE NETWORK INTERCHANGE UNIT APPLICATION-ORIENTED HALF-LINK

BACKGROUND OF THE INVENTION

1. Field of the Invention

The invention relates to private telephone networks and more particularly to real time services in interchange units of private telephone networks.

2. Description of the Prior Art

From the functional point of view, a private network interchange unit, for example the AS 4000 interchange unit supplied by the assignees of the inventors, has two separate parts. A first part of the interchange unit provides real time services and another part provides mixed mode services. The real time services are in particular services related to the transmission of calls in progress. The mixed mode services are used by machines or applications for which real time operation is not indispensable. These include call routing, specific charge metering and traffic analysis services.

Using a specific protocol for the dialog between interchange units in real time, for example the ABCF protocol, which is a multi-manufacturer protocol, used by the assignees of the inventors in particular but also by other manufacturers, is also known in the art. Another open protocol used for real time dialog between private network interchange units is the QSIG protocol, details of which can be found in ETS standard 300172.

FIG. 1 is a diagrammatic representation of two interchange units and the system elements needed to support dialog between them. As explained above, each of the interchange units 2 and 10 has a real time part 4 or 12 and a mixed mode part 6 or 14. The real time part of each interchange unit includes a line circuit 8 or 16. Each line circuit separates the interchange unit from a line 18. The two line circuits are connected together and communicate with each other according to the ABCF protocol or the QSIG protocol. Applications 20 and 22 respectively executed on the real time part of the interchange units 2 and 10 communicate via the line circuits 8 and 16 and the line 18. The figure is diagrammatic and shows only one line circuit in each interchange unit and one direct line between the two line circuits. Obviously a real configuration can be more complex than this schematic configuration.

The invention aims to solve the new problem of dialog between a mixed mode application in the mixed mode part of an interchange unit and a real time application in the real time part of a private interchange unit. Such dialog was neither provided for nor possible in the prior art interchange units.

To this end the invention proposes an application-oriented half-link which enables communication between real time and mixed mode applications.

SUMMARY OF THE INVENTION

To be more precise, the invention proposes an interchange unit for a private telecommunications network executing partly in real time and partly in mixed mode, which interchange unit includes a half-link which has an interface using a protocol used by the interchange unit for connecting real time applications to the outside and an application-oriented interface to at least one mixed mode application.

The protocol can be the QSIG protocol, for example.

Other features and advantages of the invention will become apparent on reading the following description of embodiments of the invention, which description is given by way of example only and with reference to the accompanying drawings.

BRIEF DESCRIPTION OF THE DRAWINGS

FIG. 1 is a diagrammatic representation of two prior art interchange units.

FIG. 2 is a diagrammatic representation of two interchange units implementing the invention.

FIG. 3 is a diagrammatic representation of an interchange unit in accordance with the invention.

DETAILED DESCRIPTION OF THE PREFERRED EMBODIMENTS

The invention proposes to provide an application-oriented half-link in an interchange unit, which half-link has an interface for dialog with real time applications of an interchange unit and an interface for dialog with mixed mode applications.

FIG. 2 is a diagrammatic representation of two interchange units implementing the invention. The figure shows the system elements already described with reference to FIG. 1, which are not described again. The invention proposes to provide a half-link 24 in an interchange unit 2. The half-link 24 is an application running on the real time part of the interchange unit; it has an interface modeled on the protocol for communication between two interchange units; in this example it is an interface conforming to the ABCF protocol or an interface conforming to the QSIG protocol. This first interface enables a real time application to connect to the half-link, as shown in the figure by the line connecting the real time application 26 to the half-link 24.

The half-link also has an interface enabling a mixed mode application 28 to connect to the half-link, as shown in the figure by the line joining the application 28 to the half-link 24. In this example the interface is an application interface, and depends on the environment used in the mixed mode part of the interchange unit; it can be a UNIX interface, for example.

The half-link therefore enables communication between a real time application and a mixed mode application on an interchange unit. It retains the existing layers and interfaces of the real time part of the interchange unit, and therefore limits the modifications which are necessary. In the mixed mode interchange unit, the invention enables direct connection of the applications, also without necessitating specific modifications.

One example of application of the invention will now be described. In this example, the invention is used to manage call forwarding. A user 30 of the interchange unit 10, shown diagrammatically in FIG. 2, has requested the following services:

forwarding of electronic mail to a different electronic address;

forwarding of voice calls to a number of an external site; and if the number of the external site does not answer, forwarding of calls to a secretary's number.

The above services are provided and programmed by a mixed mode application; this can be a distributed or local application, but it is in any event advantageous for the application to execute in mixed mode, to minimize the occupancy of real time resources of the interchange units. In this example, the application is symbolized by the application 28 of the interchange unit 2, which typically has traffic monitoring functions so that it can intercept calls to a number for which call forwarding has been programmed.

A user 32 of the interchange unit 2 calls the user 30 who has programmed the above services. The application 28 providing the services detects the call via the half-link 24. In the case of electronic mail, the application 28 receives the electronic mail and sends the electronic mail to the alternate electronic address programmed by the user 30; this function can advantageously be performed in mixed mode, and in this case the invention avoids occupancy of real time resources. In the case of a voice call, the application 28 sends an instruction to call the number of the external site to the call router via the half-link 24 and an instruction to call the secretary's number if there is no answer. The half-link sends the above instructions using the protocol usually employed by real time applications to communicate with each other, for example the ABCF protocol. The call from the user 32 is therefore forwarded to the number of the external site in real time. If that number does not answer, the call is directed to the secretary's number.

The invention limits the occupancy of real time resources of the interchange units; it also avoids specific modifications of the real time applications; those applications use the usual protocol for transmission between real time mode applications of the two interchange units. The presence of the call forwarding management application 28 in the interchange unit 2, for example in the case of a distributed application, further avoids any call from the interchange unit 2 to the interchange unit 10 and therefore limits the occupancy of existing communication resources between the interchange unit 2 and the interchange unit 10.

A different application of the invention is traffic observation. A traffic observation application executes in the mixed mode part of an interchange unit. It is connected to the real time part of the interchange unit via a half-link in accordance with the invention. The calls are managed by the real time part of the interchange unit; call requests and call acknowledgements are traced by the observation application, via the application-oriented half-link. In this case, the invention establishes a record of calls without needing to use a real time application. From this point of view, the resources used in the real time part of the interchange unit are limited to the half-link of the invention. The observation application can also be developed in one of the usual environments, for example under UNIX.

FIG. 3 is a diagrammatic representation of the invention. It shows the interchange unit 2, a mixed mode application 28, for example a UNIX application, a real time application 26 and the half-link of the invention. The half-link has an interface 34 using the protocol used by the interchange unit for connecting real time applications to the outside, in this example the ABCF or QSIG protocol. It also has an application interface 36 that can be addressed by the applications. The half-link handles the conversion from one format to the other, as symbolized by the arrows in FIG. 3. The invention can be implemented by the skilled person like any other application intended to execute on an interchange unit.

The interchange unit provided with a half-link according to the invention operates differently to a prior art interchange unit. Unlike the prior art interchange unit, it enables direct communication between applications or machines in the real time part and in the mixed mode part.

Of course, the invention is not limited to the embodiments described, in which a mixed mode application accesses the half-link; the half-link could be used by several applications. In the embodiments, the half-link is used to communicate with applications; it can also be used for dialog between two terminals connected to the same interchange unit, one executing in real time and the other in mixed mode. In the example shown in the figure, the half-link is shown in the real time port of the interchange unit; in fact, at least the interface of the half-link conforming to the ABCF or QSIG protocol operates in real time. It is clear that a part of the half-link need not operate in real time.

What is claimed is:

1. An interchange unit for a private telecommunications network executing partly in real time and partly in mixed mode, said interchange unit comprising:

a mixed mode part comprising at least one mixed mode application providing mixed mode services in which real time operation is not required; and a real time part comprising at least one real time application providing real time services related to transmission of call in progress, and a half-link application which enables direct communication between the mixed mode application and the real time application, the half-link application comprising:

a first interface communicably linked to the real time application and using a protocol used by the interchange unit for connecting real time applications to other interchange units; and a second interface communicably linked to the mixed mode application and the first interface.

2. The interchange unit claimed in claim 1, wherein said protocol is QSIG protocol.

* * * * *